United States Patent [19]

Bullis et al.

[11] Patent Number: 5,760,784

[45] Date of Patent: Jun. 2, 1998

[54] SYSTEM AND METHOD FOR PACING THE RATE OF DISPLAY OF DECOMPRESSED VIDEO DATA

[75] Inventors: Bryan Keith Bullis; William Robert Lee, both of Apex; Michael Patrick Muhlada, Wake Forest; Darryl Jonathan Rumph, Cary, all of N.C.

[73] Assignee: International Business Machines Corporation, Armonk, N.Y.

[21] Appl. No.: 589,212

[22] Filed: Jan. 22, 1996

[51] Int. Cl.[6] ........................................ G06F 15/00
[52] U.S. Cl. ........................................ 345/439
[58] Field of Search .................. 395/139; 345/127, 345/130, 439, 433, 196

[56] References Cited

U.S. PATENT DOCUMENTS

| 4,654,484 | 3/1987 | Reiffel et al. | 358/133 |
| 4,743,959 | 5/1988 | Frederiksen | 358/11 |
| 5,276,437 | 1/1994 | Horvath et al. | 345/119 |
| 5,289,277 | 2/1994 | Blanchard et al. | 348/441 |
| 5,418,568 | 5/1995 | Keith | 348/390 |
| 5,430,464 | 7/1995 | Lumelsky | 345/191 |

*Primary Examiner*—Phu K. Nguyen
*Attorney, Agent, or Firm*—Steven B. Phillips; Kelly K. Kordzik

[57] ABSTRACT

Video data is decompressed in a coder/decoder (CODEC) and then scaled in a scaler device before being provided to a frame buffer within a display adapter of a data processing system. Since the scaling of the video data often results in a significant increase in the required bandwidth, a buffer implemented within the scaling device may reach a threshold level whereby it is not desired that any more scaled data be received before being transmitted to the frame buffer. When such a threshold level is reached, a stall signal is sent to the interface between the scaler device and the CODEC device providing the pixel data, which results in the stopping of the transmission of pixel data from the CODEC to the scaler device. Assertion of the stall signal results in the suspension of the transmission of the horizontal and vertical synchronization signals and the pixel clock signal from the scaler device to the CODEC device.

20 Claims, 6 Drawing Sheets

SYSTEM AND METHOD FOR PACING THE RATE OF DISPLAY OF DECOMPRESSED VIDEO DATA

TECHNICAL FIELD

The present invention relates in general to data processing systems, and in particular, to the pacing of video scaling on a computer display device.

BACKGROUND INFORMATION

Desktop computers communicate information primarily via their screens, so graphics and video are a major concern for computer programmers and designers. Programmers spend enormous amounts of time and effort attempting to accommodate the proliferation of the graphical user interface ("GUI"). Millions of man-hours and billions of dollars worth of equipment are being allocated just to make improvements in the way programs display data.

The money being spent on computers equipped to perform properly under GUIs has created a vast array of computers capable of displaying complex graphical images, with resolution approaching and surpassing that of conventional media, such as television ("TV") or magazines. In turn, this capability has spawned new software designed to exploit these capabilities.

Programs using complex graphics and video are showing up in virtually every area of computing applications: games, education, desktop publishing, and graphical design, just to mention a few. These programs have one factor in common: the images they use consume prodigious amounts of disk storage.

One of the ways of solving this problem of storing and processing large amounts of graphics and video data is to perform compression/decompression of the display data. Such compression/decompression is performed typically by a CODEC. CODEC outputs are designed to drive TV monitors which, in the United States, have a pixel resolution of 640×480. The most popular CODEC standards are Motion JPEG (Joint Photographic Experts Group), the H.261 standard, and MPEG (Moving Pictures Experts Group).

Further, the dot pitch of a computer display is smaller than that of a TV As a result, a 640×480 image is smaller on a computer than on a TV To alleviate this problem, scaling of the image is performed so that the image "fits" on a high resolution computer display. Scaling is the process of enlarging or reducing a graphical or video image. Please refer to U.S. patent application Ser. No. [RA9-94-039], entitled "SYSTEM AND METHOD FOR SCALING VIDEO," which is hereby incorporated by reference herein, for a discussion of one technique for scaling video images.

One might reason that the format for video images should be made different for the higher resolution computer displays. However, there are two reasons why the pixel output remains in a TV format for CODEC devices: (1) the video decompression chip volumes target the more lucrative TV market, and (2) the TV display format keeps the data rates and data volumes at a manageable level. Also, low data rates and low data volumes results in a simple and low-cost hardware implementation: a non-stop pixel bus interface circuit, and a digital-to-analog converter ("DAC") after the CODEC, which drives the display monitor.

Scaling up a decompressed video data stream to a high-resolution computer display utilizing a standard video CODEC interface requires more frame buffer bandwidth than is typically available to a video scaling device. This problems manifests itself in any of the following manners:

(1) smaller than desired video window (ie., poor performance);

(2) incomplete video updates with unacceptable image quality; or (3) jerking motion due to dropping of entire frames.

As an example: a SIF (Sized Image Format) video stream has 320 pels/line (pixel elements per line), which has 5.5M pels/sec. (for a 58 microsecond active NTSC line at 30 Hz). Assuming a 16 bit/pel format (input and output), this equates to 11 megabits per second input data rate into the scaling device. Scaling up this SIF image by 400% equates to a 1280×960 full-screen image requiring 176 megabytes per second of sustained bandwidth from the scaling device to the frame buffer. Even with high-performance DRAMs (dynamic random access memories) (e.g., 60 nanosecond access time) configured to a high performance 64-bit frame buffer, there is roughly 110 megabytes per second of available bandwidth. However, the 32-bit frame buffer is the most prevalent graphics frame buffer solution reducing the available bandwidth to 55 megabytes per second. Both solutions are far below the required bandwidth to achieve full-screen video. Even with less prevalent, more expensive VRAM (video random access memory) solutions, this problem still exists.

Therefore, to provide high performance, high quality video solutions in a cost sensitive market, a mechanism is needed which will reduce the required frame buffer bandwidth for video data received from a scaler.

SUMMARY OF THE INVENTION

The foregoing need is satisfied by the present invention, which provides a scaler comprising an input interface operable for receiving video pixel data, video scaling circuitry, coupled to the input interface, operable for receiving the video pixel data from the input interface and operable for scaling the video pixel data, and an output interface, coupled to the video scaling circuitry, operable for receiving the scaled video pixel data and operable for transmitting the scaled video pixel data. The output interface further comprises a buffer for temporarily storing the scaled video pixel data before it is outputted from the output interface, and circuitry for sending a stall signal to the input interface when the buffer reaches a predetermined level of stored scaled video pixel data, wherein the input interface further comprises circuitry for stopping the receiving of the video pixel data by the input interface in response to the stall signal. This may be performed by halting a transmission of a pixel clock signal from the input interface to the CODEC.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which:

FIGS. 4 including

DETAILED DESCRIPTION

In the following description, numerous specific details are set forth such as specific bandwidths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 1:
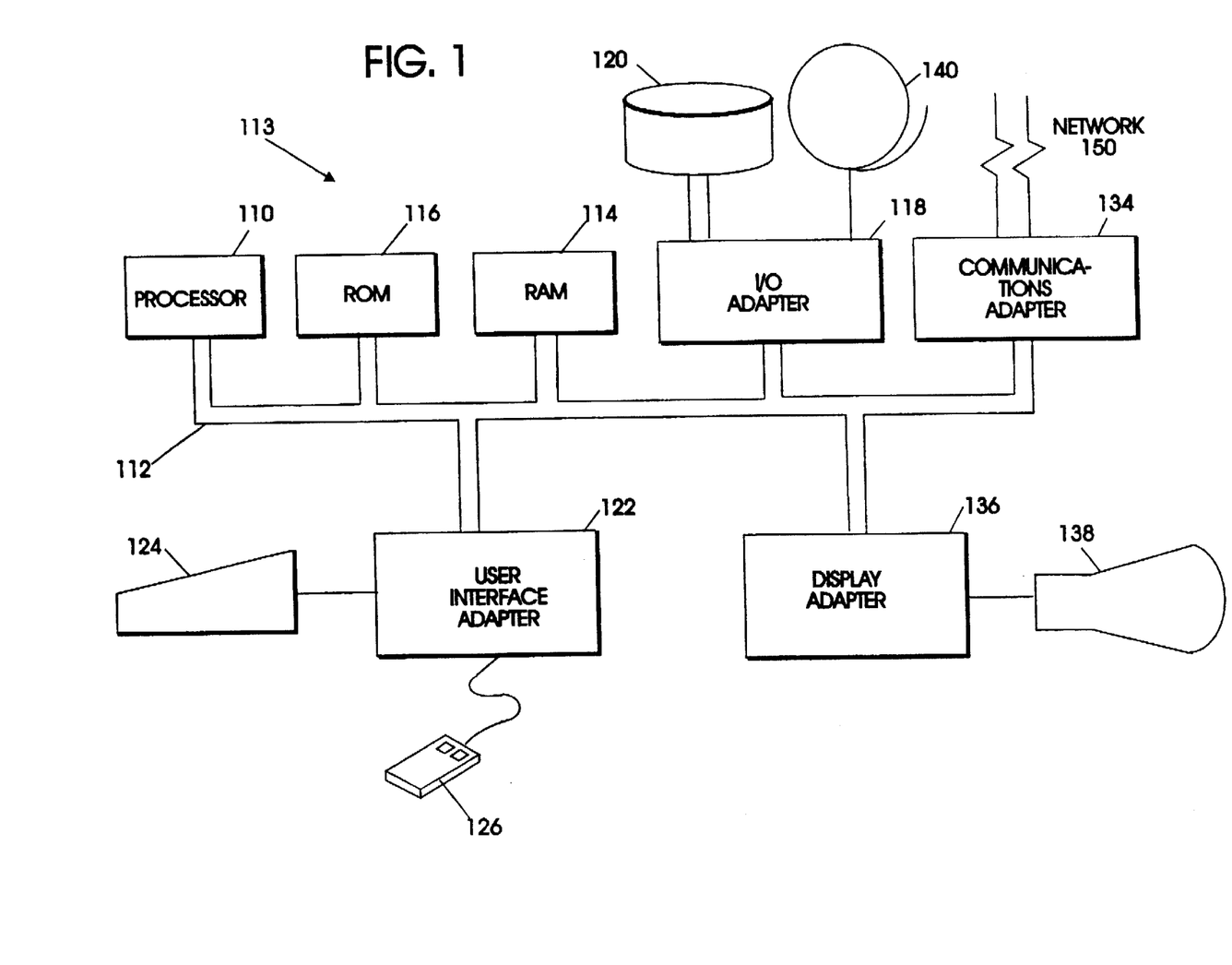
FIG. 1 illustrates in block diagram form a data processing system configurable in accordance with the present invention.

A representative hardware environment for practicing the present invention is depicted in FIG. 1, which illustrates a typical hardware configuration of workstation 113 in accordance with the subject invention having central processing unit (CPU) 110, such as a conventional microprocessor, and a number of other units interconnected via system bus 112. Workstation 113 shown in FIG. 1 includes random access memory (RAM) 114, read only memory (ROM) 116, and input/output (I/O) adapter 118 for connecting peripheral devices such as disk units 120 and tape drives 140 to bus 112, user interface adapter 122 for connecting keyboard 124, mouse 126, and/or other user interface devices such as a touch screen device (not shown) to bus 112, communications adapter 134 for connecting workstation 113 to network 150, and display adapter 136 for connecting bus 112 to display device 138. CPU 110 may include other circuitry not shown herein, which will include circuitry commonly found within a microprocessor, e.g., execution unit, bus interface unit, arithmetic logic unit, etc. CPU 110 may also reside on a single integrated circuit. Disk units 20 may include memory storage devices, such as a hard-disk or a CD-ROM. Network 150 may be coupled to any communications network, such as analog and digital microwave systems, telephone systems, satellite systems, computer systems, coaxial cable systems and fiber optic systems.

Figure 2:
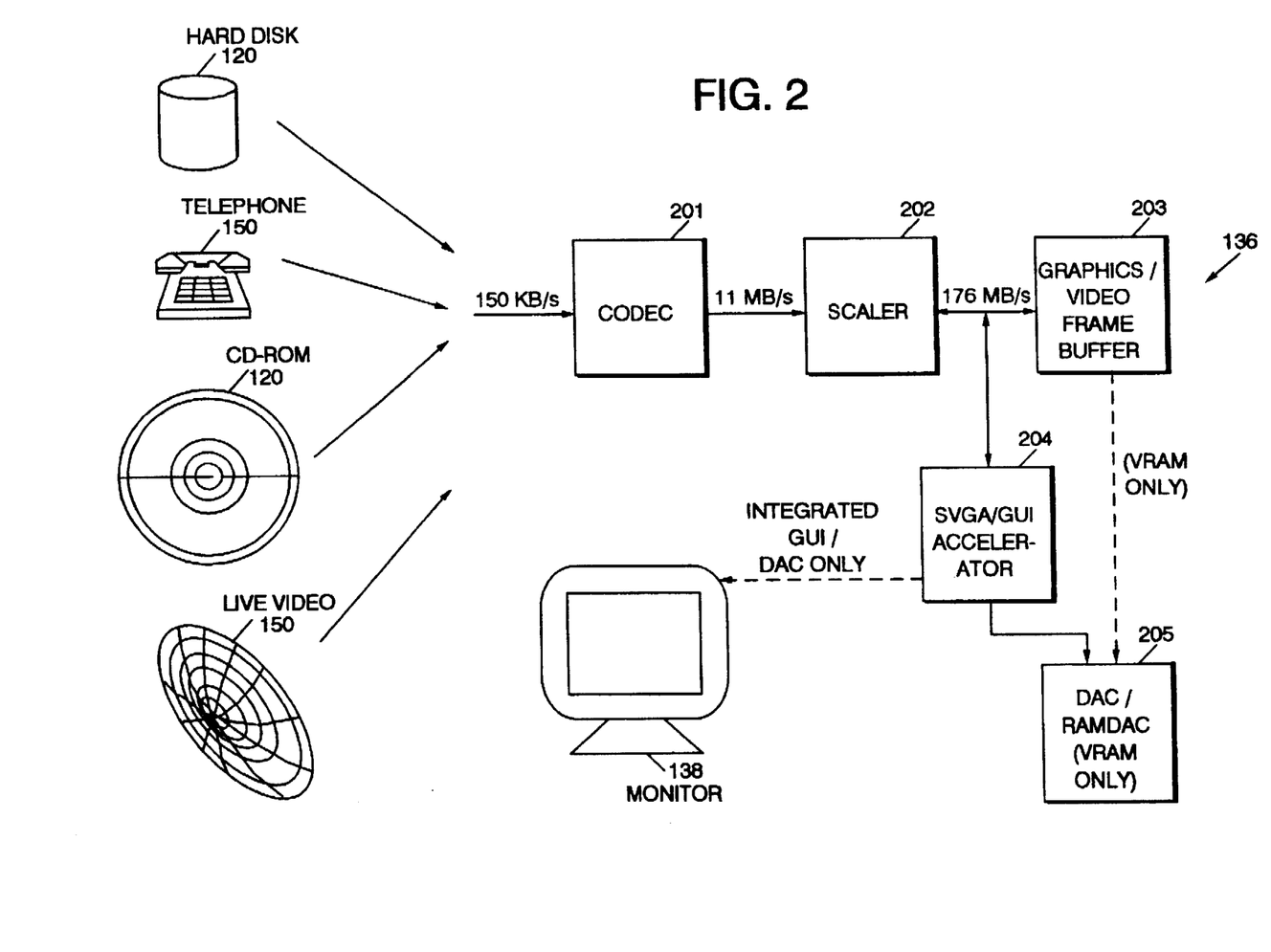
FIG. 2 illustrates in block diagram form further detail of the display adapter of the data processing system illustrated in FIG. 1.

Referring next to FIG. 2, there is illustrated a portion of system 113, including a more detailed diagram of display adapter 136 and monitor 138. Display adapter 136 includes CODEC 201, scaler device 202, graphic/video frame buffer 203, SVGA/GUI accelerator 204, and DAC/RAMDAC 205.

CODEC 201 may receive data from any one of a number of sources such as the various portions of system 113, including network 150. For purposes of illustration, FIG. 2 shows data sent to CODEC 201 from hard disk 120 or CD-ROM device 120 or from telephone network 150 or satellite network 150, which are coupled to system 113 by communications adapter 134. As briefly discussed above, any other transmission media coupled to system 113 by network 150 and communications adapter 134 may supply data to CODEC 201.

Please note that FIG. 2 illustrates specific data rate values that correspond to the discussion above. However, the present invention should not be limited to such specific data rates, which are shown here solely for illustration purposes.

CODEC 201 decompresses the received compressed video data for the first data rate increase. The data is then scaled by scaler device 202 before it is written to frame buffer 203, where it is read by graphics accelerator 204 along with any available graphics data, and is then sent to DAC 205. The analog output of DAC 205 is the analog video signals that are then sent on to monitor 138.

In one embodiment of the present invention, frame buffer 203 is "shared" by graphics accelerator 204 and video scaler 202. This is often referred to as a shared-frame buffer architecture. This approach scales the data at the last possible moment, and the scaled data has only to be moved across the frame buffer interface, which is further illustrated in FIG. 3. The frame buffer data is moved to monitor 138, but movement of graphics data to the display is independent of the presence of video scaler 202.

Use of the shared-frame buffer architecture lessens the effect of "data explosion." As can be seen by the illustration in FIG. 2, the output of scaler device 202 has a much higher bandwidth than the input of decompressed data into scaler device 202 from CODEC 201. This is often referred to as a "data explosion," which results in a much higher bandwidth requirement for the frame buffer interface within scaler device 202. As a result, scaler device 202 often cannot write the huge amounts of scaled data at the rate required. The present invention employs a mechanism by which the video output of CODEC 201 is stalled when scaler device 202 is unable to write the huge amounts of scaled data at the required rate (or frame buffer 203 is inactive and not receiving data). This stalling slows down the input pixel rate into scaler device 202 and allows scaler device 202 to "catch up" with CODEC 201.

Figure 3:
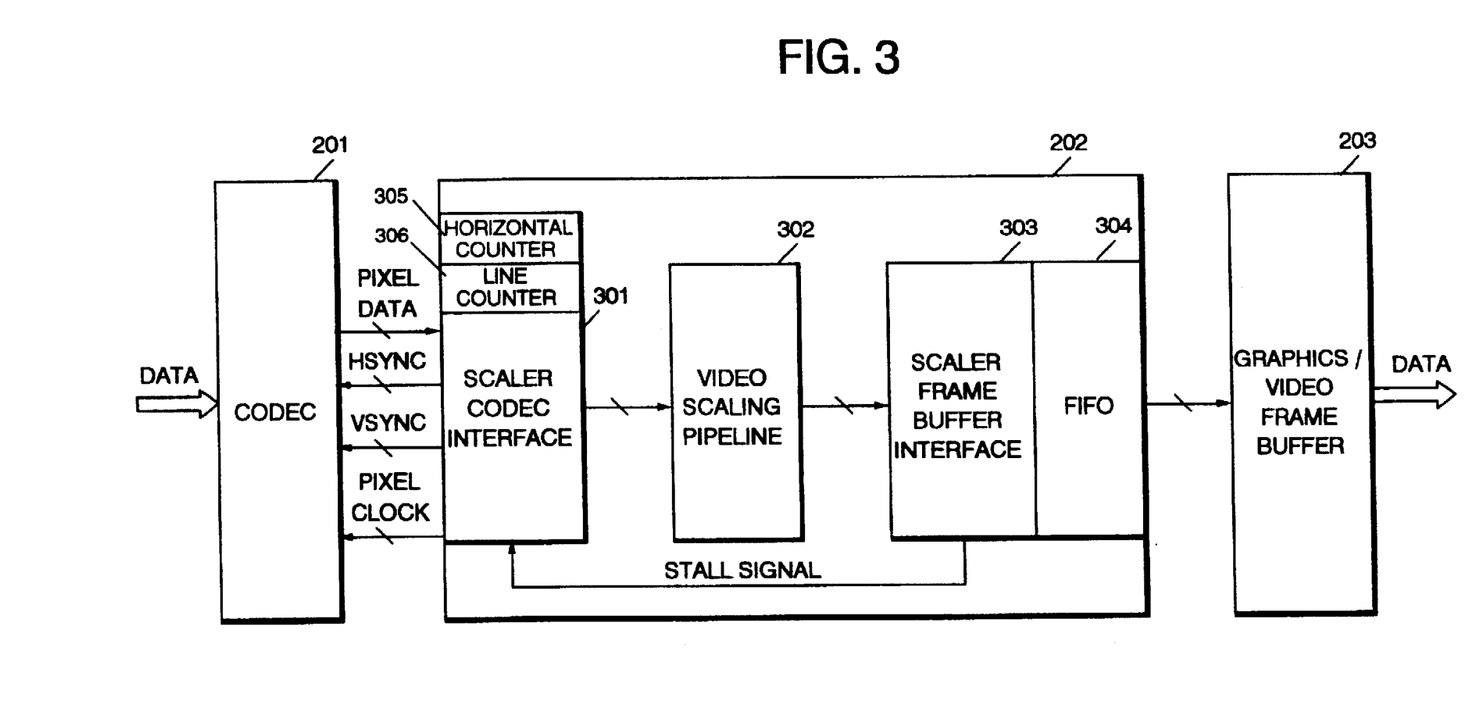
FIG. 3 illustrates in block diagram form further detail of the video scaler device illustrated in FIG. 2.

Referring next to FIG. 3, there is illustrated further detail of scaler device 202. Scaler device 202 comprises scaler CODEC interface 301, video scaling pipeline 302, and scaler frame buffer interface 303 coupled with buffer 304, which in one embodiment is a FIFO (first in/first out) buffer. Buffer 304 is needed because of the "data explosion" caused by the scaling operation of pipeline 302 and because frame buffer 203 may not be ready to handle such scaled data.

To facilitate the transfer of pixel data from CODEC 201 to scaler CODEC interface 301, scaler CODEC interface 301 is operable to provide a horizontal synchronization (HSYNC) signal, a vertical synchronization (VSYNC) signal, and a pixel clock signal to CODEC 201. Pixel data is transferred from CODEC 201 to scaler CODEC interface 301 in response to receipt of the HSYNC, VSYNC and pixel clock signals from interface 301.

Scaler frame buffer interface 303 includes buffer 304, which buffers scaled pixel data until access to frame buffer 203 can be obtained.

When buffer 304 is at the brink of overflowing (ie., it is unable to consistently empty at the maximum data rate at which it is filling up), or the content of the buffer is reaching a predetermined threshold level, control logic within buffer interface 303 asserts a stall signal, which is sent to scaler CODEC interface 301. The logic circuitry within CODEC interface 301 will in response turn off the pixel bus clock and the horizontal and vertical synchronization signals, which stops the transfer of pixel data from CODEC 201 to interface 301. When enough pixel data can be written to frame buffer 203 to reduce the data level within buffer 304 below the predetermined threshold level, the stall signal is then de-asserted. This causes CODEC interface 301 to resume operation by restarting the pixel bus clock and the HSYNC and VSYNC signals.

If the scaling ratio of scaler device 202 is small enough such that a FIFO overflow condition is never encountered, the stall signal is never asserted, and scaler CODEC interface logic 301 will provide the pixel clock and HSYNCN-SYNC signals to CODEC 201 in a consistent, periodic fashion.

Figure 4A:
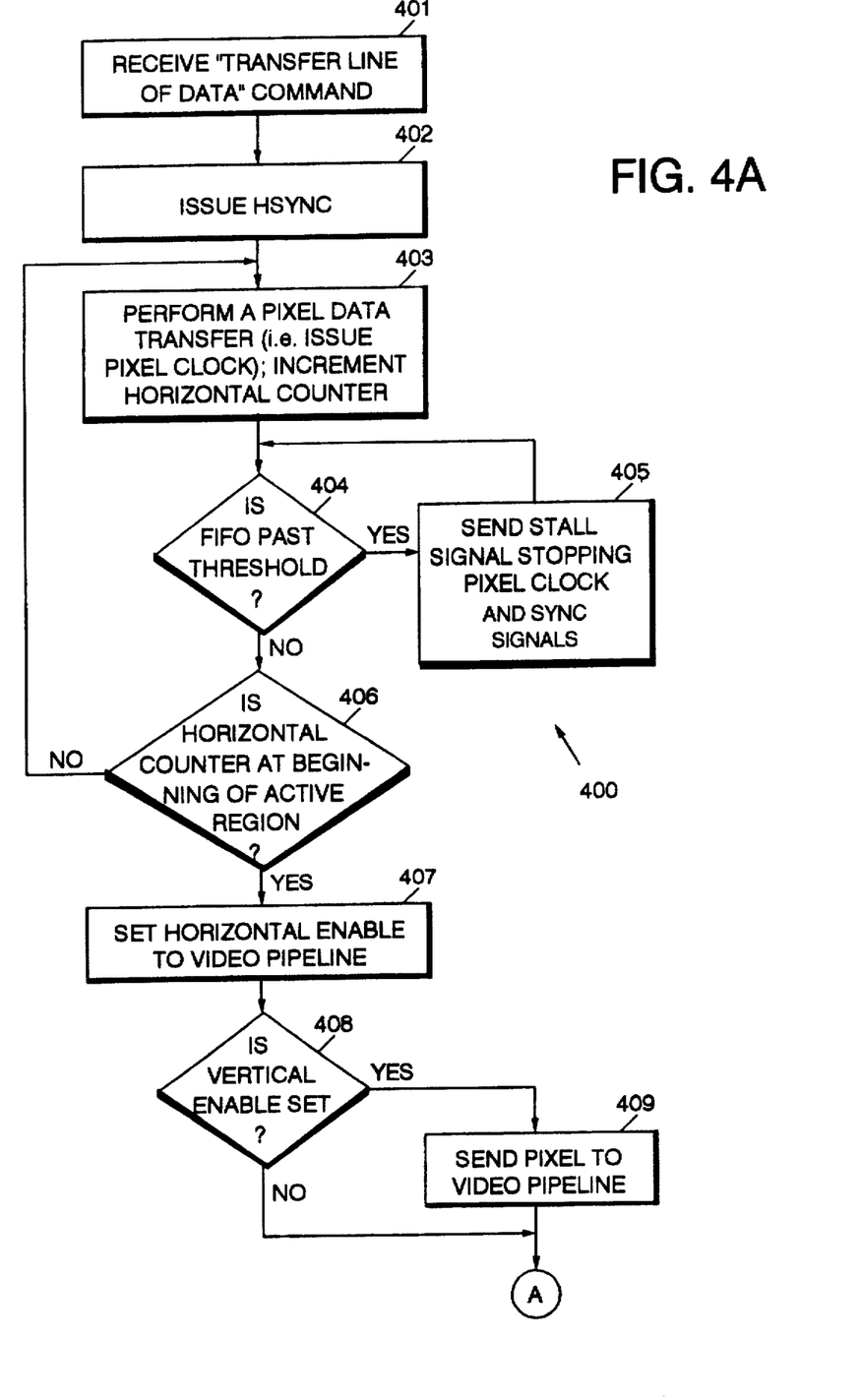
FIGS. 4A-4B and 5 illustrate a flow diagram in accordance with the present invention.
Figure 4B:
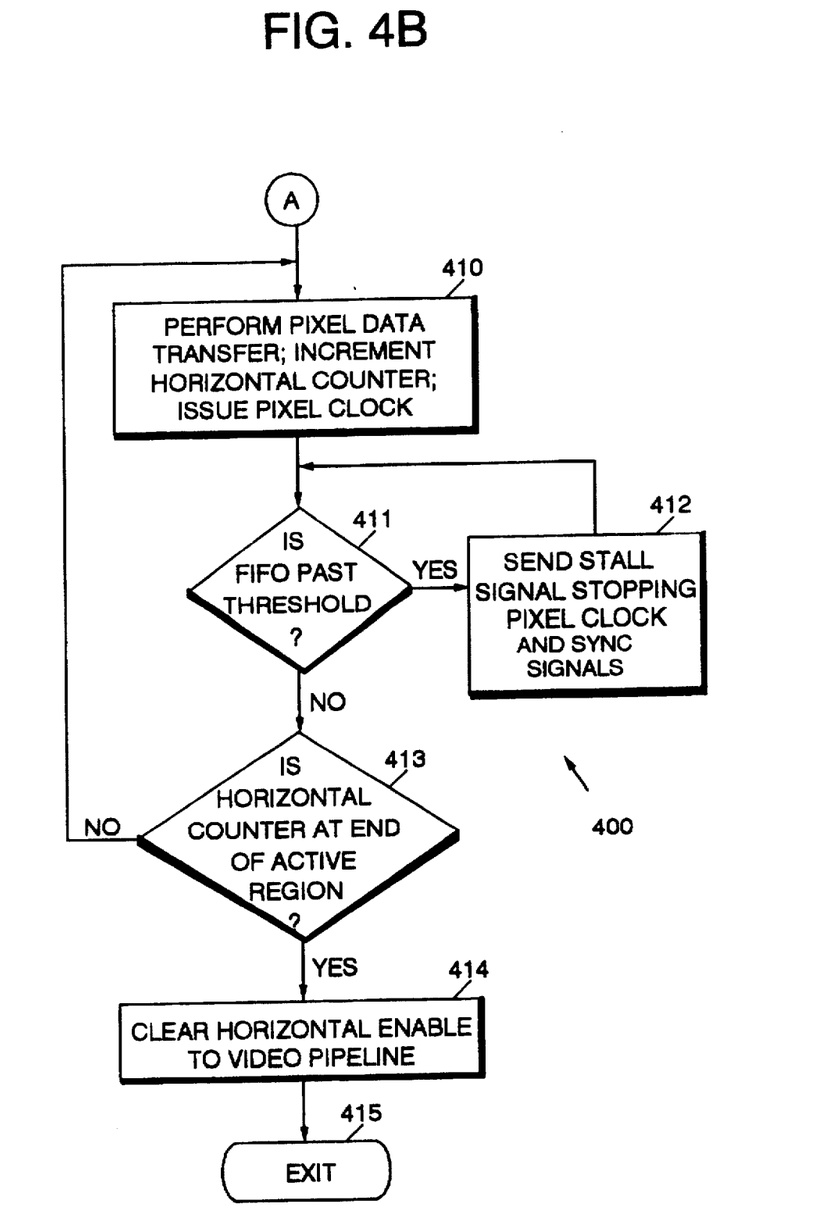
Figure 5:
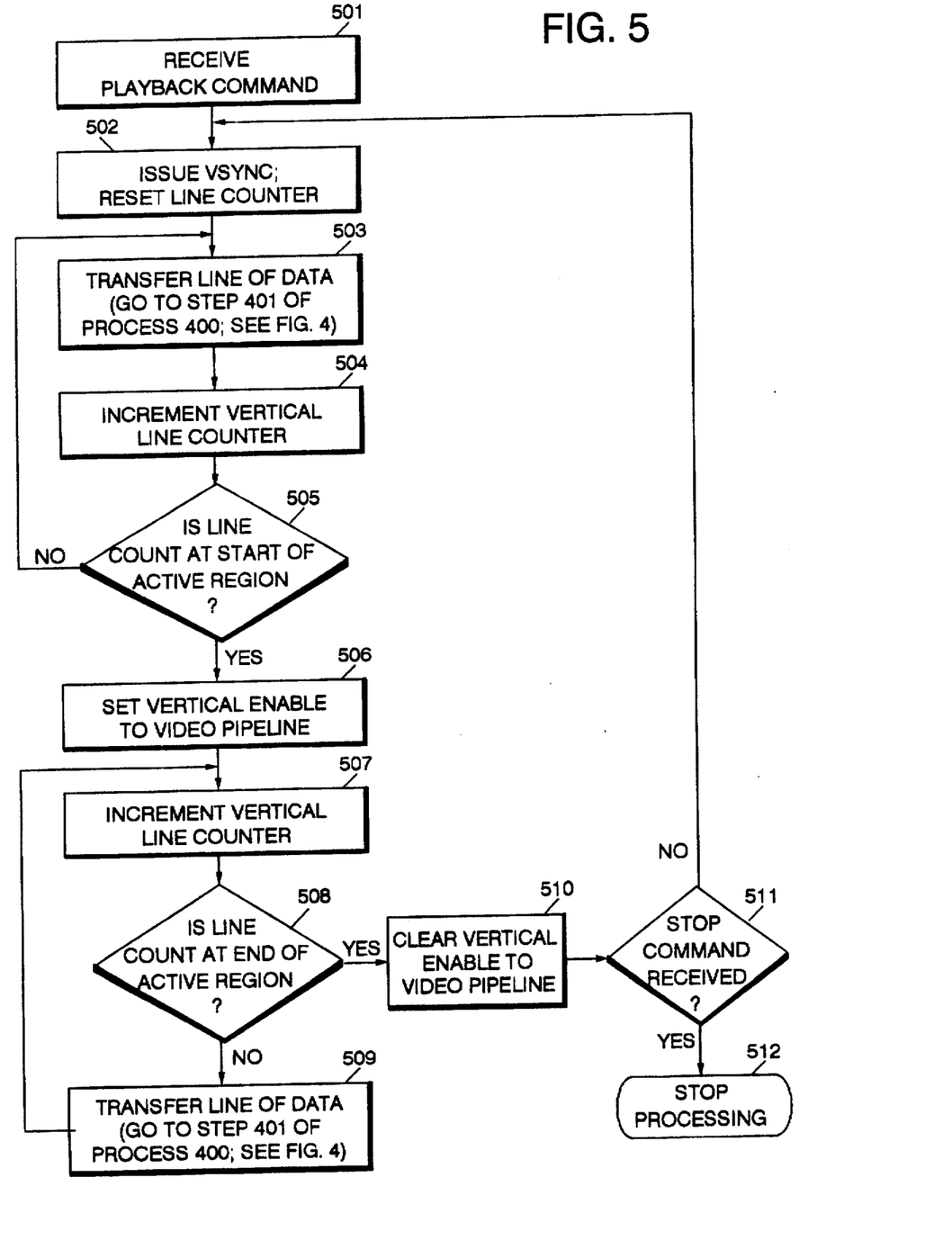

Referring next to FIGS. 4 and 5, there is illustrated flow diagrams of the operation of logic circuitry within scaler device 202 for implementing the above-described stall signal.

Referring first to FIG. 5, the process begins with step 501 where a playback command is received. The playback command is typically issued at the time that CODEC 201 is initialized. For example, in a windows-like environment on a computer, such as system 113, this would occur when the user selects an MPEG playback application via mouse 126 or keyboard 124. The software driver would then write an associated register (not shown) on video scaler 202 to enable the playback. In response to this playback command, the process proceeds to step 502 to issue the VSYNC signal and to reset line counter 306. Thereafter, in step 503, a line of data is transferred by proceeding to step 401 within process 400.

Referring next to FIG. 4, in step 401, a "transfer line of data" command is initiated by the playback command initiated within system 113 for transferring video data to display 138. In response to this command, scaler device 202 will issue the HSYNC signal to CODEC 201 in step 402. Thereafter, in step 403, a pixel data transfer operation is performed, ie., the pixel clock is issued from interface 301 to CODEC 201. Additionally, in step 403, horizontal counter 305 is incremented.

Next, in step 404, a determination is made whether or not the threshold value of buffer 304 has been surpassed. If so, then in step 405, the stall signal is then sent to interface 301 from interface 303, which results in the stopping of the transmission of the pixel clock signal from CODEC interface 301 to CODEC 201. This loop continues until the data level within buffer 304 is below a predetermined threshold value.

At that point, the process proceeds to step 406 to determine whether or not horizontal counter 305 indicates that it is at the beginning of an active region. An active region begins where a blanking region (no actual video pixels) ends, before a video picture begins on the screen of display 138.

If the active region has not been reached, the process returns to step 403 to increment horizontal counter 305. However, if the active region for the display of video has been reached, the process proceeds to step 407 to set the horizontal enable provided from CODEC interface 301 to video scaling pipeline 302. Any scaling process may be utilized within pipeline 302.

In step 408, a determination is made whether or not the vertical enable has been set. There is a register (not shown) on scaler device 202 (programmable by software) that determines the vertical line count at which the vertical enable is set. This will be referred to as VSTART. When VSYNC is issued, vertical counter 306 is set to zero, and incremented by one for each horizontal line. Vertical counter 306 is not set until the vertical count reaches a count equal to VSTART. There is another programmable resister (not shown) that determines the vertical line count at which the vertical enable is cleared (disabled). This will be referred to as VSTOP. At the time when vertical counter 306 is between the value of VSTART and VSTOP (which is by definition greater than VSTART), the vertical enable is set. This is the means by which vertical cropping is performed to crop out undesired lines from the top and bottom of the image prior to scaling. In other words, VSTART and VSTOP determine the vertical active region during which the vertical enable is set. If the vertical enable has been set, the process proceeds to step 409 to send a pixel to video scaling pipeline 302. However, if in step 408 the vertical enable has not been set, then step 409 is bypassed. Thereafter, in step 410, a pixel data transfer is performed, horizontal counter 305 is incremented and the pixel clock is issued. Next, in step 411, the same determination as described above with respect to 404 is performed. If the threshold value has been surpassed, the process proceeds to step 412 to transmit the stall signal to stop the transfer of the pixel clock to CODEC 201.

After steps 411 and 412, the process proceeds to step 413 to determine whether or not horizontal counter 305 indicates that the system is at the end of an active video region. If not, the process loops back to step 410 to continue performing a pixel data transfer. However, if horizontal counter 305 indicates that an end of an active region has been reached, the process proceeds to step 414, to clear the horizontal enable signal provided to video scaling pipeline 302. The process then ends the transfer line of data process 400 at step 415.

Upon exiting process 400, the process of the present invention returns to step 504 to increment line counter 306. In step 505, a determination is made whether or not the line count is at the beginning of an active region. If not, the process returns to step 503 to transfer another line of data. However, once the active region is reached, the process proceeds to step 506 to set the vertical enable provided to video scaling pipeline 302.

Thereafter, in step 507, line counter 306 is incremented. In step 508, a determination is made whether or not line counter 306 indicates that the system has reached the end of an active region. If not, then another line of data is transferred via process 400. If another line of data is transferred, then the present invention will return to step 507 to increment line counter 306.

If in step 508, the end of the active region has been reached, then in step 510, the vertical enable signal provided to video scaling pipeline 302 is cleared. Thereafter, in step 511, a determination is made whether or not a command to stop video processing has been received. If not, the process will return to step 502 to reset line counter 306 and to begin the transmission of another video frame. If in step 511, the stop command has been received, then the process will proceed to step 512 to stop video processing.

Although the present invention and its advantages have been described in detail, it should be understood that various changes, substitutions and alterations can be made herein without departing from the spirit and scope of the invention as defined by the appended claims.

What is claimed is:

1. A scaler comprising:
    an input interface operable for receiving pixel data;
    video scaling circuitry, coupled to said input interface, operable for receiving said pixel data from said input interface and operable for scaling said pixel data; and
    an output interface, coupled to said video scaling circuitry, operable for receiving said scaled pixel data and operable for transmitting said scaled pixel data, wherein said output interface further comprises:

a buffer for temporarily storing said scaled pixel data before said scaled pixel data is outputted from said output interface; and circuitry for sending a stall signal to said input interface when said buffer reaches a predetermined level of stored scaled pixel data, wherein said input interface further comprises:

circuitry for stopping said receiving of said pixel data by said input interface in response to said stall signal.

2. The scaler as recited in claim 1, wherein said stopping circuitry further comprises:

circuitry for stopping a transmission of a pixel clock signal from said input interface.

3. The scaler as recited in claim 1, wherein said pixel data comprises video data.

4. The scaler as recited in claim 1, wherein said scaling of said pixel data is a scaling up operation.

5. A data processing system comprising:

a processor;

a storage device;

an input device;

a display apparatus; and a bus for coupling said processor, said storage device, said input device, and said display apparatus, wherein said display apparatus further comprises:

a CODEC operable for decompressing received compressed pixel data;

a scaler, coupled to said CODEC, and operable for receiving said decompressed pixel data and scaling said decompressed pixel data; and a frame buffer, coupled to said scaler, operable for receiving said scaled pixel data from said scaler, wherein said scaler further comprises:

a buffer for temporarily storing said scaled pixel data before transmitting said scaled pixel data to said frame buffer; and circuitry for stopping a receipt of said decompressed pixel data by said scaler from said CODEC when said buffer contains a predetermined amount of said scaled pixel data.

6. The system as recited in claim 5, wherein said stopping circuitry further comprises:

circuitry for stopping a transmission of a pixel clock signal from said scaler to said CODEC.

7. The system as recited in claim 5, wherein said pixel data comprises video data.

8. The system as recited in claim 5, wherein said compressed pixel data is received from said storage device.

9. The system as recited in claim 8, wherein said storage device is a CD-ROM.

10. The system as recited in claim 8, wherein said storage device is a hard disk.

11. The system as recited in claim 5, wherein said compressed pixel data is received from a telecommunications network coupled to said system.

12. The system as recited in claim 5, wherein said scaler further comprises:

circuitry for restarting said receipt of said decompressed pixel data by said scaler from said CODEC when said buffer has emptied its contents below said predetermined amount of said scaled pixel data.

13. In a data processing system, a method comprising the steps of:

transferring decompressed data from a CODEC to a scaler;

scaling said decompressed data to produce scaled data;

transferring said scaled data from said scaler to a frame buffer; and stopping said transferring of said decompressed data from said CODEC to said scaler when a rate of said transferring of said scaled data from said scaler to said frame buffer is less than a predetermined rate.

14. The method as recited in claim 13, wherein said stopping step further comprises the steps of:

monitoring a data level in a buffer in said scaler; and performing said stopping step when said data level exceeds a predetermined data level.

15. The method as recited in claim 14, wherein said scaler includes an input interface for controlling receipt of said decompressed data from said CODEC, and wherein said buffer is coupled to an output interface coupling said scaler to said frame buffer, and wherein said performing step further comprises the steps of:

sending a stall signal from said output interface to said input interface when said data level exceeds said predetermined data level; and discontinuing a transmission of a pixel clock signal from said input interface to said CODEC in response to said stall signal.

16. The method as recited in claim 15, wherein said data is video data.

17. The method as recited in claim 16, wherein said step of transferring decompressed data from said CODEC to said scaler further comprises the steps of:

1) initiating a transfer of a first line of video data by sending vertical and horizontal synchronous signals from said input interface to said CODEC;

2) issuing said pixel clock signal from said input interface to said CODEC;

3) performing a pixel data transfer from said CODEC to said input interface in response to receipt by said CODEC of said pixel clock signal and said vertical and horizontal synchronous signals;

4) incrementing a horizontal counter in response to receipt by said CODEC of said pixel clock signal and said vertical and horizontal synchronous signals;

5) determining if said predetermined data level has been exceeded;

6) performing said sending and said discontinuing steps if said predetermined data level has been exceeded and returning to step 5);

7) determining if said horizontal counter indicates that an active region has been reached;

8) returning to step 3) if said horizontal counter indicates that said active region has not been reached;

9) setting a horizontal enable signal to a video data scaling pipeline of said scaler if said horizontal counter indicates that said active region has been reached;

10) determining if a vertical enable signal has been set;

11) sending a video pixel to said video data scaling pipeline if said vertical enable signal has been set;

12) performing another pixel data transfer, incrementing said horizontal counter, and issuing said pixel clock signal whether or not step 11) is performed;

13) determining if said predetermined data level has been exceeded;

14) performing said sending and said discontinuing steps if said predetermined data level has been exceeded and returning to step 13);

15) determining if said horizontal counter indicates that an end of said active region has been reached;

16) returning to step 12) if said horizontal counter indicates that said end of said active region has not been reached;

17) clearing said horizontal enable signal to said video data scaling pipeline of said scaler if said horizontal counter indicates that said end of said active region has been reached;

18) incrementing a line counter;

19) determining if said line counter indicates that said active region has been reached;

20) returning to step 2) if said line counter indicates that said active region has not been reached;

21) setting said vertical enable signal to said video data scaling pipeline if said line counter indicates that said active region has been reached;

22) incrementing said line counter;

23) determining if said line counter indicates that an end of said active region has been reached;

24) performing steps 2) through 17) if said line counter indicates that said end of said active region has not been reached;

25) returning to step 22);

26) clearing said vertical enable signal if said line counter indicates that said end of said active region has been reached;

27) determining if a command has been received to stop transferring video pixel data;

28) returning to step 1) for a next line of video data if said command has not been received; and 29) discontinuing processing of said video data if said command has been received.

18. A display adaptor comprising:

a CODEC operable for receiving compressed video data and for decompressing said video data;

control circuitry for transferring said decompressed video data from said CODEC to a scaler, wherein said scaler is operable for scaling said decompressed video data to produce scaled video data;

control circuitry for transferring said scaled video data from said scaler to a frame buffer; and control circuitry for stopping said transferring of said decompressed video data from said CODEC to said scaler when a rate of said transferring of said scaled video data from said scaler to said frame buffer is less than a predetermined rate.

19. The display adaptor as recited in claim 18, wherein said stopping control circuitry further comprises:

circuitry for monitoring a video data level in a buffer in said scaler; and circuitry for performing said stopping of said transferring of said decompressed video data from said CODEC to said scaler when said video data level exceeds a predetermined video data level.

20. The display adaptor as recited in claim 19, wherein said scaler includes an input interface for controlling receipt of said decompressed video data from said CODEC, and wherein said buffer is coupled to an output interface coupling said scaler to said frame buffer, and wherein said performing circuitry further comprises:

circuitry for sending a stall signal from said output interface to said input interface when said video data level exceeds said predetermined video data level; and circuitry for discontinuing a transmission of a pixel clock signal from said input interface to said CODEC in response to said stall signal.

* * * * *